United States Patent
Fulghum

(10) Patent No.: US 6,728,326 B1
(45) Date of Patent: Apr. 27, 2004

(54) REDUCED COMPLEXITY FOR INITIAL MOBILE TERMINAL SYNCHRONIZATION

(75) Inventor: Tracy Fulghum, Durham, NC (US)

(73) Assignee: Ericsson Inc., Research Triangle Park, NC (US)

(*) Notice: Subject to any disclaimer, the term of this patent is extended or adjusted under 35 U.S.C. 154(b) by 0 days.

(21) Appl. No.: 09/528,926

(22) Filed: Mar. 20, 2000

(51) Int. Cl.⁷ ................................................. H04L 7/00
(52) U.S. Cl. ..................... 375/365; 375/362; 370/514
(58) Field of Search ................................ 375/362, 365, 375/344, 354, 367; 370/509, 512, 514, 516

(56) References Cited

U.S. PATENT DOCUMENTS

| | | | |
|---|---|---|---|
| 5,428,668 A | | 6/1995 | Dent et al. |
| 5,457,716 A | * | 10/1995 | Ang et al. ................... 375/344 |
| 5,581,597 A | | 12/1996 | Dent et al. |
| 5,652,772 A | * | 7/1997 | Isaksson et al. ............ 375/367 |
| 5,839,075 A | | 11/1998 | Haartsen et al. |
| 6,275,551 B1 | * | 8/2001 | Nomura et al. ............. 375/365 |
| 6,310,896 B1 | * | 10/2001 | Langberg et al. ........... 370/503 |
| 6,459,744 B1 | * | 10/2002 | Helard et al. ................ 375/354 |

* cited by examiner

*Primary Examiner*—Phoung Phu
(74) *Attorney, Agent, or Firm*—Coats & Bennett, P.L.L.C.

(57) ABSTRACT

A method and apparatus reduces the complexity of initial synchronization in mobile terminals operating in TDMA communications systems. A TDMA transmission comprises multiple repeating time slots marked by synchronization words. Initial synchronization requires locating at least one time slot in the received signal. Information in a slot is received as a sequence of symbols at a defined symbol rate. The mobile terminal receives the TDMA transmission for a period longer than one time slot and samples a baseband version of the received signal at M times the symbol rate. This oversampling produces M symbol-rate sample sets, with each sample set corresponding to one of M sampling phases. The mobile terminal performs a FFT on each one of the plurality of the M sample sets after raising it to the $n^{th}$ power, where n is based on the number of modulation phases used to transmit the symbols. Results from the FFT permit the mobile terminal to identify possible frequency offsets in the local oscillator and to select the preferred sample set for sync word correlation. The mobile terminal correlates a known sync pattern with the preferred sample set compensated using the possible frequency offsets to determine the sync word location.

23 Claims, 7 Drawing Sheets

REDUCED COMPLEXITY FOR INITIAL MOBILE TERMINAL SYNCHRONIZATION

BACKGROUND OF THE INVENTION

The present invention relates generally to wireless communication systems and, more particularly, to a method for synchronizing mobile terminals within such communication systems.

The number of mobile terminals in use has grown rapidly over the past decade. However, the available bandwidth to accommodate the increasing number of users is essentially fixed. Consequently, much effort is devoted to devising ways to improve the spectral efficiency of wireless communication systems so that the demand for wireless services can be met. For example, a variety of multiple access schemes have been devised that allow multiple users to share the same radio channel carrier frequency. One common multiple access scheme is known as Time Division Multiple Access, or TDMA. A wireless communication system that employs TDMA is referred to herein as a TDMA system.

In a TDMA system, each carrier frequency is divided into repeating frames. The frames are subdivided into a plurality of time slots. A mobile terminal is assigned one or more slots on separate transmit and receive frequencies. Assigned slots on both transmit and receive frequencies represent a communications channel. Wireless terminals transmit signals to the serving base station in short bursts in their assigned slot(s) on the transmit frequency and receive transmitted bursts from the serving base station in their assigned slot(s) on the receive frequency. Thus, each pair of frequencies (transmit and receive) can support a number of users equal to the number of slots in a frame. In this manner, TDMA-based systems greatly increase the number of individual users supported by the defined set of frequencies.

Mobile terminals operating in a TDMA system must synchronize with the base station and avoid interfering with other mobile terminals operating on the same frequency. Information transmitted by the base station in each time slot includes a predefined synchronization word (sync word). By identifying the location of a sync word in a received signal, a mobile terminal can synchronize with the base station. Ideally, the mobile terminal performs initial synchronization after powering up by selecting a frequency on which the base station is transmitting, receiving a portion of a signal transmitted by the base station for a period of time greater than at least one TDMA slot, and identifying the location of the predefined sync word within the received signal. To do this, the mobile terminal typically mixes the received signal down to a baseband frequency and samples this baseband signal at a rate corresponding to the symbol rate of the transmitted signal to generate a signal sample set. The signal sample set is then correlated with a known sync word pattern to determine the location of the sync word in the signal sample set. However, successfully determining the location of the sync word depends on achieving an acceptable correlation threshold between one of a defined set of sync words or patterns and a subset of the signal sample set.

Sampling the baseband signal to generate the signal sample set used for sync word correlation should be done at the ideal symbol period sampling point where the sample instances are at the peak response of the symbol. However, the sampling phase corresponding to this ideal symbol sampling point is unknown to the mobile terminal at initial synchronization. Additionally, any offset in the mobile terminal's local oscillator (LO) frequency is unknown. This LO frequency is used to mix the received signal down to baseband frequency and LO frequency offsets cause corresponding offsets in actual baseband signal frequency. Often, the magnitude of possible LO frequency offset error greatly exceeds the offset error permissible in the baseband frequency for successful sync word correlation. The frequency span of possible baseband offset error must then be divided into a set of trial frequencies separated by frequency steps that do not exceed the magnitude of permissible offset error. Since the actual LO offset is unknown, the signal sample set must be compensated using the set of trial frequencies. Sync word correlation must be performed using the signal sample set compensated for each trial frequency until an acceptable correlation threshold is found, resulting in a computationally expensive and time consuming set of operations. In some implementations, multiple signal sample sets are generated at different sampling phases. In this case, the above set of trial frequency compensations and correlation calculations must be performed for each one of the multiple signal sample sets.

As an example of initial synchronization processing, a particular Digital Advanced Mobile Phone System (D-AMPS) mobile terminal captures a block of 1600 complex samples of the received signal after it is converted to the baseband frequency. The samples are taken at eight times the transmitted symbol rate. This set of 1600 samples is arbitrarily downsampled to a single sample per received symbol, which leaves one set of 200 symbol-rate samples (1600/8= 200). For successful sync word correlation, the mobile terminal must compensate the selected symbol-rate sample set for baseband offset frequency. The mobile terminal must apply compensation to within ±300 Hz of the actual baseband offset frequency. Since the offset frequency is unknown and can be as much as ±9 KHz, the mobile terminal creates a set of trial frequencies, spanning the 18 KHz range in 600 Hz steps. The mobile terminal then performs correlation operations using the selected symbol-rate sample set compensated by each one of these trial frequencies until an acceptable sync word correlation threshold is achieved. The mobile terminal performs up to 31 such correlation operations, one for each of the trial frequencies. Because D-AMPS uses multiple sync words, the above process may not result in an acceptable correlation threshold being achieved for the sync word initially chosen by the mobile terminal. If not, the mobile terminal repeats the trial frequency compensation and correlation operations for each possible sync word until an acceptable correlation threshold is achieved. If the mobile terminal successfully correlates one of the predefined sync words with the captured data set, it captures a new set of baseband data using predefined slot timing to verify location of the same sync word a second time. This second verification completes the initial synchronization process.

The computational complexity of the initial synchronization can result in significant delays in acquiring service when the mobile phone is initially turned on. Therefore, a less computationally intensive synchronization method would be desirable.

SUMMARY OF THE INVENTION

The present invention provides a method and apparatus for reducing the complexity of initial synchronization in a mobile terminal operating in a TDMA system. A mobile terminal receives a downlink transmission from a base station for a period greater than one TDMA time-slot. Symbol-encoded information transmitted by the base station during this period includes at least one predefined sync word. Using a local oscillator having an unknown frequency offset error, the mobile terminal mixes the received signal down to a baseband frequency. The frequency offset error is therefore impressed onto the baseband signal. Sampling this baseband signal at a rate M times faster than the transmitted symbol rate, the mobile terminal generates M symbol-rate sample sets having M different sampling phases. The mobile terminal performs a Fast Fourier Transform (FFT) on each one of the M symbol-rate sample sets after raising it to the $n^{th}$ power to remove the effect of signal modulation. The value of n depends on the number of modulation phases used in transmission. For example, with Quadrature Phase-Shift Keying (QPSK) modulation, n equals 4. The mobile terminal compares the peak magnitude from each FFT and selects the sample set corresponding to the greatest peak value. The selected sample set represents the symbol-rate sample set having the preferred sampling phase. The frequency at which the peak FFT magnitude occurs corresponds to the LO offset frequency times n, which is a result of passing the sample set through the $n^{th}$ law device. However, in D-AMPS, n times the actual LO offset frequency may result in a frequency above the Nyquist limit imposed by the baseband FFT sampling rate. Therefore, the offset frequency found in the FFT data set having the greatest peak magnitude may be n times the actual LO offset frequency, or may be one of a small number of possible aliases. In D-AMPS, as in any practical system, the possible range of LO offset is limited by design. Therefore, alias frequencies outside this possible range are discarded and the remaining small set of frequencies is used to compensate the selected baseband symbol-rate sample set in sync word correlation operations. In the earlier D-AMPS example, the set of trial frequencies includes 31 different compensation frequencies. The present invention reduces the set of trial frequencies to three, thereby reducing the complexity of the calculations.

DETAILED DESCRIPTION OF THE INVENTION

Figure 1:
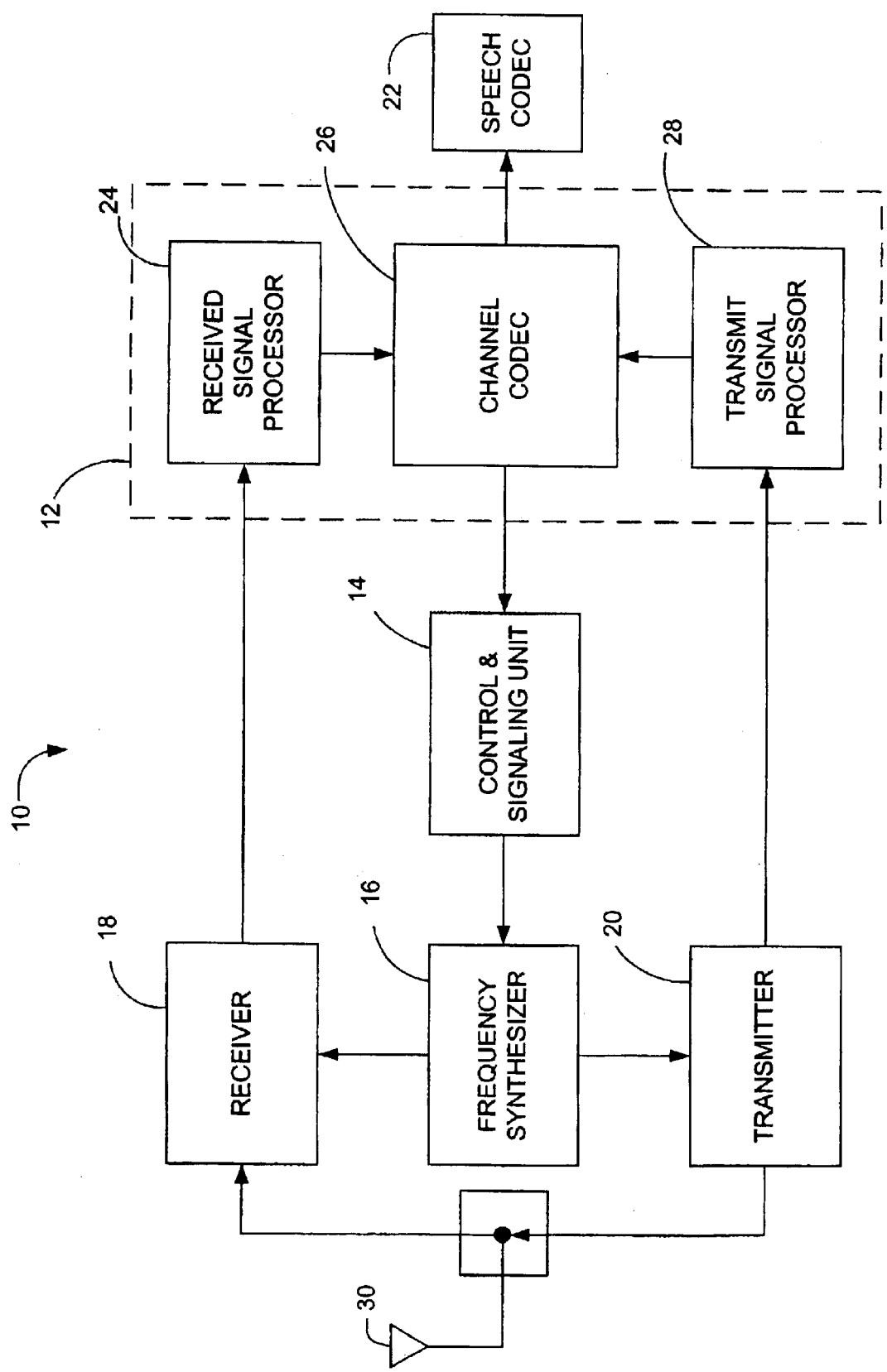
FIG. 1 is a simplified block diagram of a mobile terminal.

FIG. 1 illustrates a representative mobile terminal using the initial synchronization method of the present invention. The mobile terminal is generally indicated by the numeral 10. The mobile terminal 10 includes a signal processing unit 12, a control and signaling unit 14, a frequency synthesizer 16, a burst receiver 18, a burst transmitter 20, a speech codec 26, and an antenna 30. The burst receiver 18 receives transmitted signals and the burst transmitter 20 transmits signals. The signal processing unit 12 includes a received signal processor 24, a transmit signal processor 28, and a channel codec 26. The received signal processor 24 includes a demodulator and demultiplexer to extract the transmitted bit stream from a received burst and to sort the received information from the different time slots and frames into their appropriate channels. Typically, the received signal processor 24 also includes a power measurement circuit (not shown) to measure the strength of the signal received at the antenna 30, and a bit error determination circuit (not shown) to determine received information quality. The power and quality measurements are passed to the control and signaling unit 14.

The channel codec 26 decodes the bit sequence coming from the received signal processor 24. If the decoded bit stream is a speech frame, then the channel codec 26 passes it to the speech codec 22. If the decoded bit stream is a signaling frame, it is passed to the control and signaling unit 14. To perform its control functions, the control and signaling unit 14 exchanges signaling messages with the base station or wireless communication network. These signaling messages are prepared or processed in the control and signaling unit 14 and are passed to or received from the channel codec 26.

The transmit signal processor 28, which includes a multiplexer and modulator, prepares signals for transmission. The transmit signal processor 28 places coded bit sequences received from the channel codec 26 in the appropriate burst structure. The multiplexer (not shown) assigns each individual burst to a timeslot in a numbered frame. After the bit sequence is sorted and ordered the modulator (not shown) impresses the bit sequence on the carrier frequency for transmission by the transmitter 20.

The frequency synthesizer 16 provides internal timing references for the bit and frame clock as well as for the RF sources in the receiver and transmitter. A voltage-controlled oscillator (not shown) within the frequency synthesizer assumes a stable operating frequency as commanded by the control and signaling unit 14. The frequency synthesizer 16 produces a reference frequency for mixing the received signal to a lower frequency before digital sampling. This reference frequency is set to nominal value but can have a frequency error above or below the nominal value. The range of frequency error for the reference frequency is a function of the mobile terminal 10 design and operating conditions.

The receiver 18 uses the synthesizer reference frequency to mix the received signal down to a lower frequency signal for use by the signal processor 12. As will be readily appreciated by those skilled in the art, the receiver 18 may provide additional filtering, limiting, or automatic gain control functions. The signal processor 12 cooperates with the control and signaling unit 14 and receiver 18 during initial signal reception to synchronize with the slot timing of the transmitted signal. This initial synchronization process is explained in more detail below.

Figure 2:
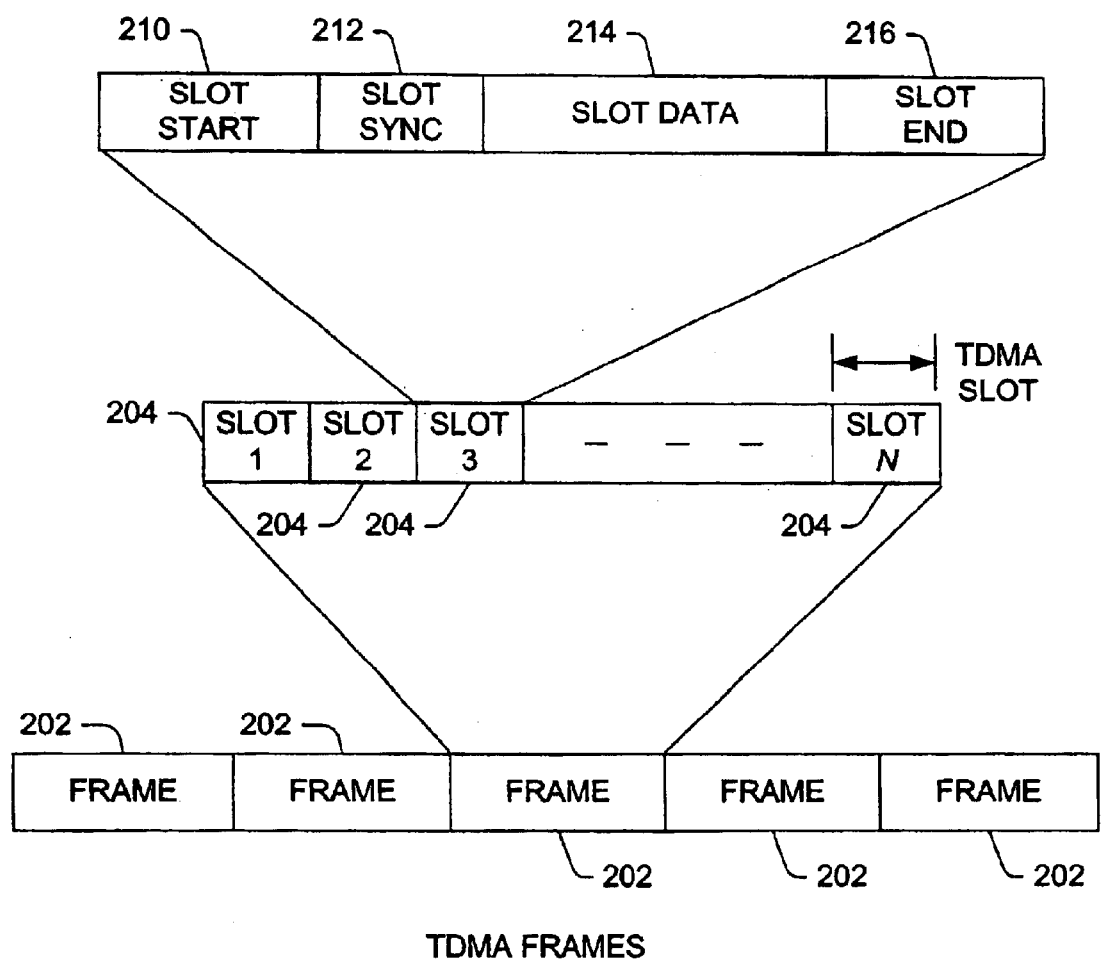
FIG. 2 illustrates a representative TDMA frame structure.

In TDMA systems, the mobile terminal 10 communicates with the base station in assigned time slots on both transmit and receive frequencies. Each carrier frequency is divided into repeating frames 202 as shown in FIG. 2. Each frame 202 has a defined width. The frames 202 are subdivided into a plurality of time slots 204. A start block 210 and an end block 216 delimit each time slot 204. The start block 210 is followed by a known synchronization word ("sync word ") 212 of predetermined length. The slot data 214 is transmitted following the sync word 212 and prior to the end block 216. Note that, in actual practice, start and end blocks may be implicit within the TDMA frames. For example, the sync word may itself serve as the start block, with the end block appearing a predefined and known number of symbol periods later.

In TIA/EIA-136 systems, there are six time slots 204 in a frame 202. In GSM systems, there are eight time slots 204 in a frame 202. The mobile terminal 10 transmits and receives in short bursts in an assigned time slot 204 on both the transmit and receive frequencies. In a full rate system, the mobile terminal 10 is assigned two time slots 204 per frame 202 on both the transmit and receive frequencies. In a half-rate system, the mobile terminal 10 is assigned a single time slot 204 on both transmit and receive frequencies. To avoid interfering with other users, each mobile terminal 10 must synchronize to its assigned time slots 204 so that its bursts do not overlap with transmissions from other mobile terminals 10. The mobile terminal 10 must also be synchronized to receive transmissions from the base station intended for it.

Synchronization is performed when a mobile terminal 10 is first turned on. First, the mobile terminal 10 tunes its receiver 18 nominally to a frequency that may contain the digital downlink transmission. At this point, there may be some frequency error between the tuning of the receiver 18 and the actual downlink transmission frequency. After this nominal tuning, the mobile terminal 10 synchronizes in time with the digital transmission and makes some coarse estimation of frequency offset or error. Selection of the carrier frequency itself is in accordance with the methods well known in the art. It is in this first synchronization after power-up where the bulk of the frequency offset is estimated and addressed. Note that other circumstances, such as when a dual-mode (analog and digital) AMPS/D-AMPS phone is handed off from an analog to a digital channel, may require coarse estimation of frequency offset. For initial time synchronization, the mobile terminal 10 receives a downlink transmission from a base station on the selected carrier frequency and looks for a known sync word 212 in the received sequence. The mobile terminal 10 receives a portion of the downlink transmission for a period of time longer than one TDMA slot time to ensure receipt of at least one sync word in the received signal.

Figure 3A:
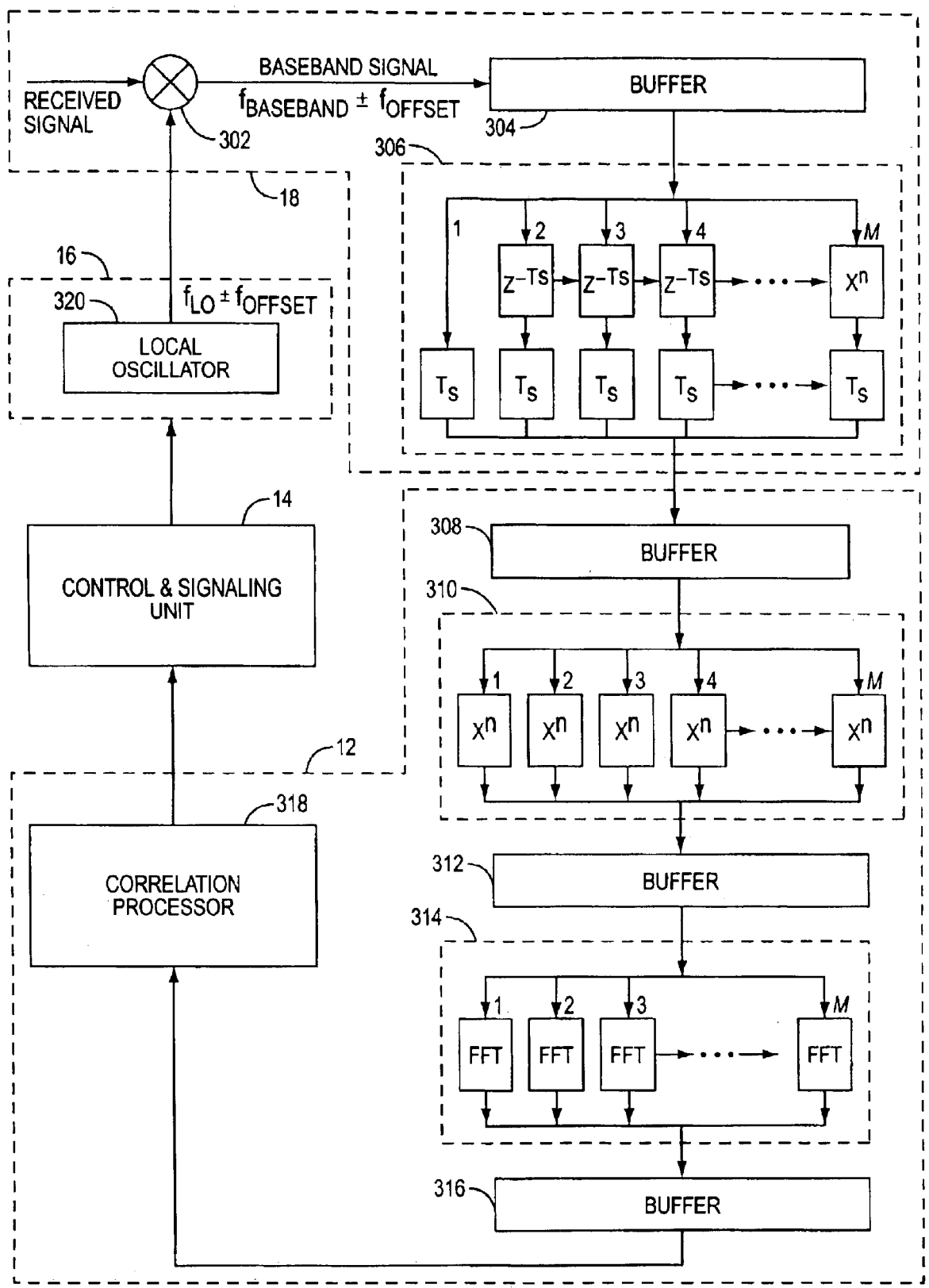
FIG. 3A is a block diagram of a preferred embodiment of the present invention.

FIG. 3A is a more detailed diagram of the mobile terminal 10 in accordance with a preferred embodiment of the present invention. The mobile terminal 10 includes a mixer 302 and a receive filter 301 for converting the received signal to a lower frequency or baseband frequency, a sampling process 303 to sample the lower frequency signal, a buffer 304 for buffering the sampled data, and a signal processor 12, such as a digital-signal-processor (DSP), to perform a sequence of operations on the buffered data. The signal processor 12 contains a correlation processor 318 for performing sync word correlation of the sampled and processed data to find the sync word. The mixer 302 uses an injection signal from a local oscillator (LO) 320 to mix the received signal to an intermediate frequency, $f_{IF}$. In the baseband receiver shown in the example embodiment, $f_{IF}=0$. The output frequency of the LO 320 has a nominal value $f_{LO}$. However, the actual output frequency of the LO 320 is $f_{LO} \pm f_{OFFSET}$, where the value of the offset frequency is unknown. The offset frequency of the LO 320 is impressed onto the baseband signal output from the mixer 302. Therefore, the actual frequency of the baseband signal is $f_{IF} \pm f_{OFFSET}$.

Figure 5A:
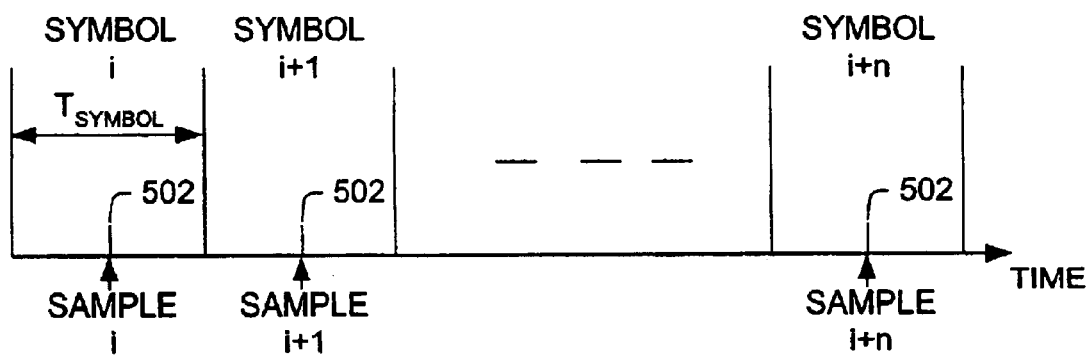
FIG. 5A illustrates nominal symbol-rate sampling.
Figure 5B:
FIG. 5B illustrates 8× symbol-rate oversampling.

The sampled, baseband signal held in buffer 304 contains a sequence of transmitted symbols spanning a period greater than one TDMA slot. Therefore, at least one subsequence of symbols within the buffered baseband signal represents a known sync word. As the sampling process 303 samples the baseband signal at a rate M-times the symbol rate, buffer 304 holds M-times oversampled baseband signal data. This M-times oversampled signal is then downsampled by down- sampler 306 to produce symbol-rate samples. Ideally, the resulting symbol-rate samples are taken at the ideal symbol sampling point 502 for each symbol, as illustrated in FIG. 5A. In the example of the oversampled signal shown in FIG. 5B, the oversampling factor equal 8 (M=8). Thus, there are eight possible ways to downsample the M-times oversampled samples, to produce a symbol-rate sample set. Stated differently, there are eight possible symbol-rate sampling phases from which to choose. In the illustration of FIG. 5B, the seventh sampling phase (symbol rate samples from sampling phase 7) is closest to the ideal sampling point 502. In prior, typical implementations of this process, the mobile terminal 10 does not know the ideal sampling phase, and the downsampler 306 picks an arbitrary sampling phase for the symbol rate samples. However, with benefit of a sampling phase control signal, the downsampler 306 in a preferred embodiment of the present invention downsamples the oversampled signal using the closest-to-ideal sampling phase from among the M available sampling phases.

The sampling phase controller 310 provides control, otherwise absent, over the sampling phase chosen by the downsampler 306. The sampling phase controller 310 also provides an estimate of the reduced set of trial frequencies for use by the correlation processor 318 in its determination of the synchronization point and estimate of the actual LO frequency offset. The determined synchronization point is used by the control and signaling unit 14 to establish the beginning of the slot for purposes of typical signal processing. The estimated offset frequency is used by the control and signaling unit 14 to adjust the local oscillator 320, to reduce the frequency offset of $f_{LO}$.

Figure 3B:
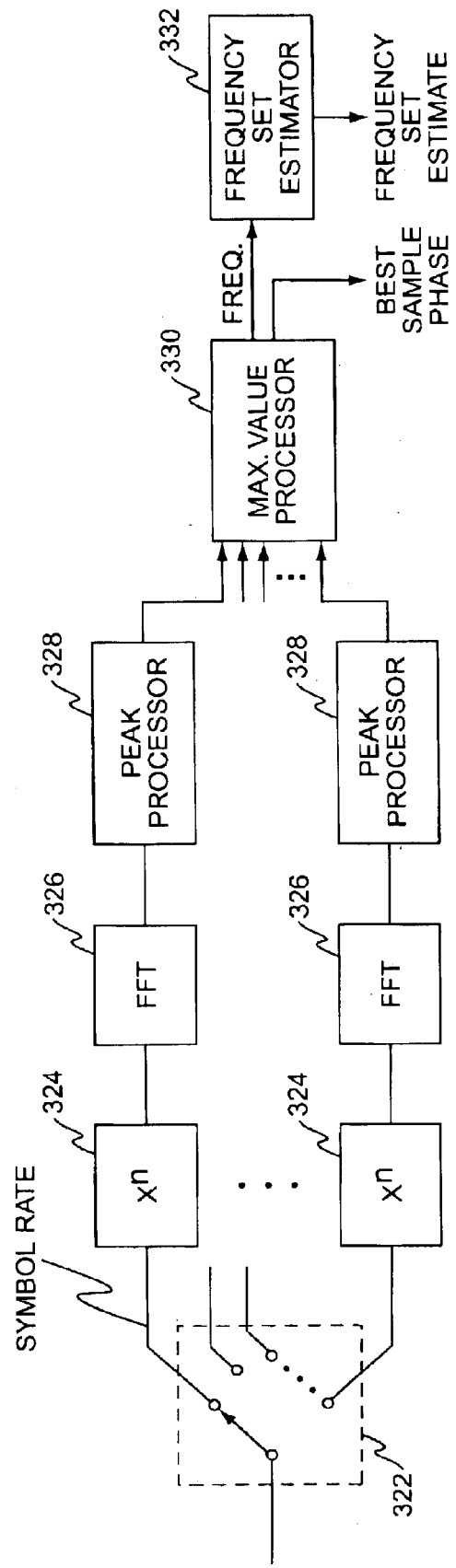
FIG. 3B is a more detailed block diagram of a sampling phase control process in accordance with a preferred embodiment of the present invention.

FIG. 3B provides more detail regarding the structure of the sampling phase controller 310 as relates to its operation in determining the closest-to-ideal sampling phase from the M sampling phases. As noted, the downsampler 306 uses the determined sampling phase to downsample the M-rate signal samples held in buffer 304. The M-rate samples are separated by a sample set demultiplexer 322 to form M sets of symbol-rate samples. Each of the M symbol-rate samples sets corresponds to a different (one of M) symbol-sampling phase. Each symbol-rate sample set is processed in a similar manner in the illustrated parallel function branches. Each set of symbol-rate samples is passed through an $n^{th}$ law process 324, where n corresponds to the number of phases used in the phase modulation for symbol transmission. In a D-AMPS system, for example, n=4. For those symbol-rate sample sets having a sampling phase at or near the ideal symbol-sampling point 502, raising them to the fourth power removes the effect of the phase modulation.

Absent any offset frequency error in $f_{Lo}$ output by LO 320, the result of the $n^{th}$ power operation on sample sets taken at the ideal sampling phase is a DC signal. However, with offset present in the frequency $f_{LO}$, the $n^{th}$ power operation results in a distinct complex tone having a frequency directly related to the frequency offset ($f_{OFFSET}$) in the LO 320. For those symbol rate sample sets not taken at or very near to the ideal symbol rate sampling point 502, the output of the $n^{th}$ law process 324 will contain broadband, intersymbol interference (ISI), produced by intersymbol terms. For such sample sets, the output of the $n^{th}$ law process 324 will not exhibit a clear tone related to the offset frequency of LO 320.

After processing by the $n^{th}$ law process 324, each of the symbol-rate sample sets are processed by an FFT processor 326 and the resulting frequency components are processed by a peak processor 328 to determine a peak magnitude in each FFT data set. Then, the maximum value processor 330 determines which of the peak magnitudes represents the maximum peak magnitude from among the FFT data. By identifying the FFT data set containing the maximum peak magnitude, the maximum value processor identifies the specific symbol-rate sample set that corresponds to the identified FFT data set. This identified symbol-rate sample set represents the symbol-rate sample set corresponding to the sampling phase nearest the ideal symbol sampling point 502. Thus, identifying the FFT data set containing the maximum peak magnitude allows the maximum value processor to identify the preferred symbol-rate sampling set as indicated by the control signal to downsampler 306.

Based on the results of FFT processing, the frequency set estimator determines the frequency component associated with the maximum peak magnitude in the identified FFT data set. The frequency associated with this maximum peak magnitude is used by the frequency set estimator 332 to produce the reduced trial frequency set used by correlation processor 318. Thus, correlation processor obtains the preferred symbol-rate sample set from buffer 308 and compensates this preferred symbol-rate sample set for LO 320 frequency error using the set of compensation values determined by the frequency set estimator 332.

Figure 6:
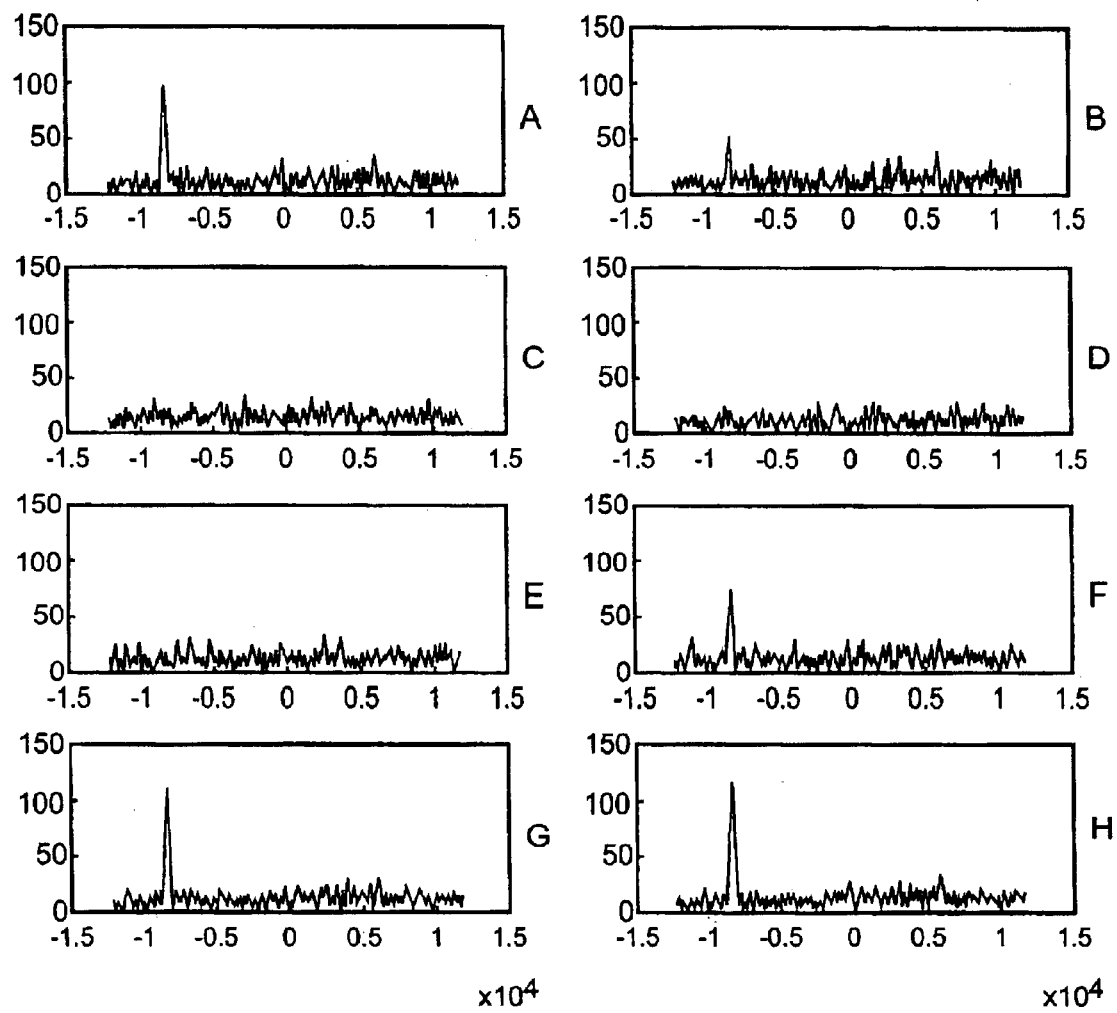
FIG. 6 illustrates the FFT magnitude plots for a set of representative FFT data sets in accordance with the present invention.

FIG. 6 graphically depicts a set of eight FFT data sets developed from a set of initial sample sets in accordance with the present invention. Note that in FIG. 6, the horizontal axis represents frequency, while the vertical axis represents the magnitude of the FFT coefficients. As described above, plots B, C, D, and E exhibit the effect of broadband ISI interference as a consequence of their corresponding FFT data sets being developed from initial samples sets taken at the incorrect baseband signal sampling phase. In contrast, plots A, F, G, and H all exhibit characteristic peaking at a frequency of approximately 8.3 kHz, with plot H having the maximum peak magnitude. For illustration, the 8.3 kHz peak offset frequency represents the unknown local oscillator offset frequency $f_{OFFSET}$ times n. The n times multiplication of offset frequency $f_{OFFSET}$ is a consequence of passing the symbol-rate sample sets through the $n^{th}$ law process 324 to remove the effect of modulation.

Further note that, depending on the actual local oscillator offset frequency $f_{OFFSET}$ and FFT sampling rate, the offset frequency $f_{OFFSET}$ of the FFT data set peak magnitude may be an alias of the actual offset frequency $f_{OFFSET}$. If the FFT samples are taken at a rate lower than twice the maximum possible LO offset frequency $f_{OFFSET}$ times n, the frequency of maximum peak FFT magnitude may represent the actual LO offset frequency $f_{OFFSET}$ or an alias frequency. Frequency aliasing in a digital sampling system is a well-understood consequence of sampling at less than the Nyquist frequency. For example, in a D-AMPS system, the data sampling rate for the FFT operations is 24.3 KHz. Sampling theorem holds that for a sampling rate of 24.3 KHz, the maximum frequency in the sampled signal must be no more than half the sampling rate, or 12.150 KHz. Therefore, for a D-AMPS system having possible LO offset frequencies $f_{OFFSET}$ of ±9 KHz, passing the symbol-rate sample sets through the $n^{th}$ law process 324 in FIG. 3B can result in complex tone frequencies greater than one half the Nyquist rate (½ of 24.3 KHz)—this results from the n times $f_{OFFSET}$ effect of the $n^{th}$ law process.

However, the relationship between the actual offset frequency $f_{OFFSET}$ and the possible alias frequencies is well understood in the art. The following equation represents the possible local oscillator offset frequencies $f_{OFFSET}$ based on the frequency measured in the FFT data set corresponding to the peak FFT magnitude, $$f'_{OFFSET} = \frac{f_{PEAK}}{n} \pm \frac{if_{SAMPLE}}{n} \qquad \text{(Eq. 1)}$$

Where $f_{OFFSET}$=the trial set of possible LO offset frequencies used for trial frequency compensations in correlation operations, $f_{PEAK}$=the frequency of the peak FFT magnitude, $f_{SAMPLE}$=the frequency at which the FFT data was sampled, and i equals the set of integers {1,2}. Correlation processor 318 implements Equation 1, resulting in a set of four frequencies for $f_{OFFSET}$. Correlation processor 318 then discards any frequency in this set corresponding to a frequency outside the range of possible LO offset frequencies, typically one frequency may be thrown out leaving three frequencies remaining in the trial set. Correlation processor 318 then individually uses the set of trial offset frequencies as possible values for the unknown $f_{OFFSET}$ to compensate the selected symbol-rate sample set for the unknown baseband frequency offset during sync word correlation operations.

Figure 4:
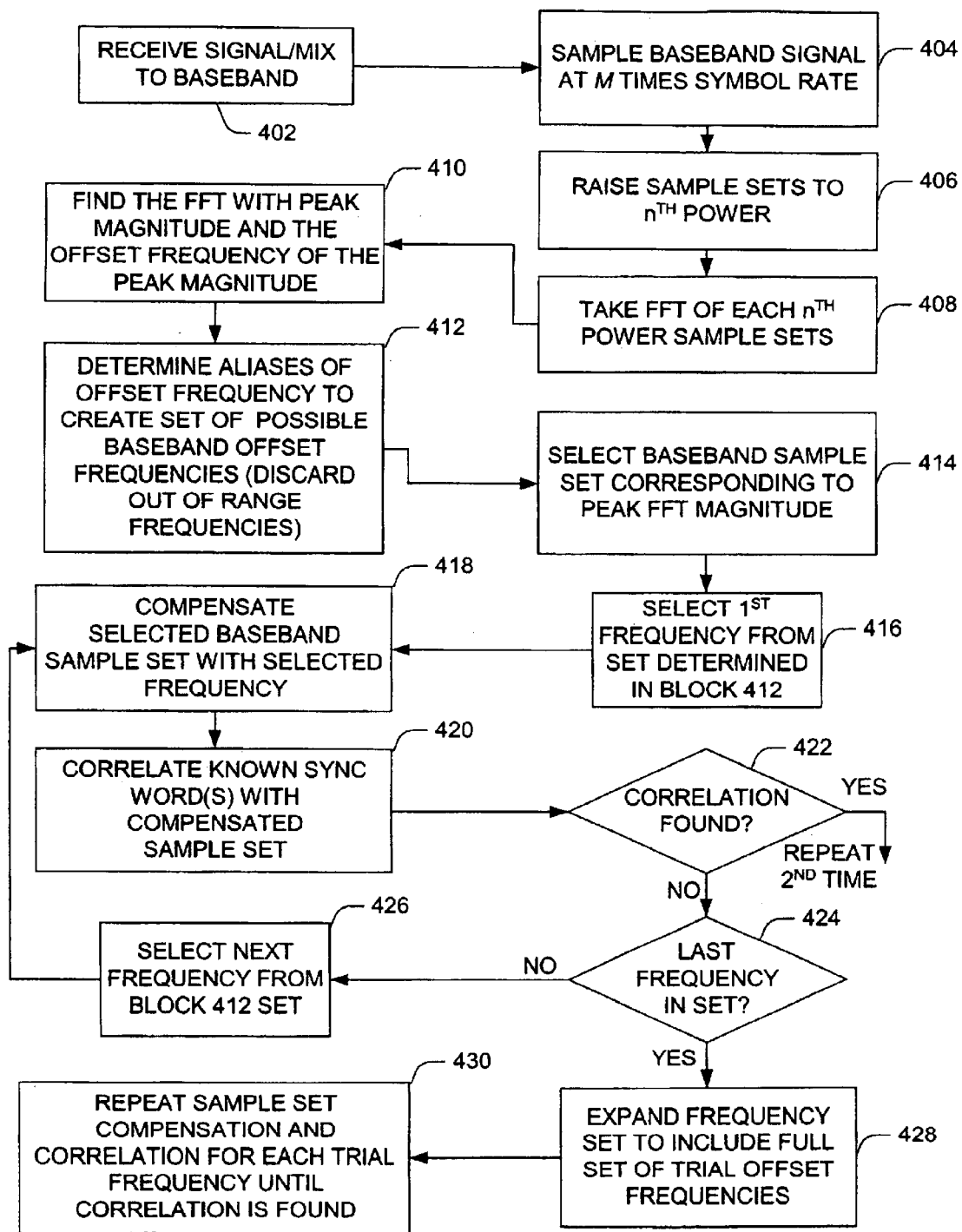
FIG. 4 is a flow diagram of a preferred method for practicing the present invention.

FIG. 4 outlines the logical flow of initial synchronization operations in accordance with the present invention. Once the mobile terminal 10 selects a nominal downlink transmission frequency in accordance with methods well known in the art, it receives the downlink transmission for a time period greater than at least one TDMA slot 204 and mixes the received signal down to the baseband frequency in block 402. The mobile terminal 10 then samples the captured baseband signal at M times the transmitted symbol rate in block 404, creating M symbol-rate sample sets, with each of the symbol-rate sample sets having a different symbol period sampling phase. A plurality of the M symbol-rate sample sets are raised to the $n^{th}$ power in block 406, which removes the effect of modulation only for those symbol-rate sample sets taken at or near the ideal symbol sampling point 502. Buffer 406 holds the plurality of n-power sample sets in preparation for FFT processing. The mobile terminal 10 performs an FFT in block 408 on each of the plurality of n-power sample sets to produce a plurality of FFT data sets.

The plurality of FFT data sets are processed in block 410 to determine a peak magnitude (maximum value) for each FFT data set and to identify the FFT data set from among the plurality of FFT data sets that contains the maximum peak magnitude. In block 412, the mobile terminal 10 calculates a set of possible offset frequencies corresponding to the frequency of the maximum peak magnitude in the identified FFT data set, taking frequency aliasing and mobile terminal 10 design tolerances into account. The FFT data set having the peak FFT magnitude corresponds to the symbol-rate sample set closest to the ideal symbol sampling point 502. For example, if the oversampling rate M=8 and FFT data set number 7 contains the peak FFT magnitude, then symbol-rate sample set number 7 contains the symbol-rate samples taken closest to the ideal symbol sampling point 502. In block 414, the mobile terminal 10 uses the FFT data set number identified in block 410 to identify the preferred symbol-rate sample set.

Then, in block 416, the mobile terminal 10 selects the first trial frequency from the small set of possible trial offset frequencies determined in block 412. In block 418, the mobile terminal uses the trial offset frequency selected in block 416 to frequency-compensate the selected symbol-rate sample set. The mobile terminal 10 then performs correlation operations between the frequency-compensated symbol-rate sample set and a predefined set of sync words in block 420. Processing then advances to decision block 422. If one of a set of defined sync words was successfully correlated with a data sequence in the frequency-compensated symbol-rate sample set, the mobile terminal 10 repeats blocks 402 through 422, using its knowledge of downlink transmission timing to verify that the same sync word is located a second time. If the same sync word is located a second time in the same location, initial synchronization is complete. If no correlation is found, processing continues from decision block 422 to decision block 424. In block 424, the mobile terminal 10 determines if there are any untried trial frequencies from the set determined in block 412. If so, the next frequency is selected in block 426 and processing returns to block 418, where the selected symbol-rate sample set is compensated using the next frequency. If there are no untried frequencies remaining, processing continues to block 428, where prior art techniques as described previously are used in an attempt to achieve initial synchronization.

The foregoing description of both methods and apparatus represents a preferred embodiment for practicing the present invention. However, as those skilled in the art will readily appreciate, many variations of this preferred embodiment may be practiced without departing from the scope and spirit of the present invention. As an example, the apparatus illustrated in the block diagram of FIGS. 3A and 3B may be wholly incorporated into a highly integrated DSP, such as depicted generally in FIG. 2 as signal processor 12. With such an embodiment, stored program code providing initial synchronization functions execute on the DSP in a time-shared manner, permitting the DSP to execute additional program instructions related to controlling other mobile terminal functions. Alternatively, various functions including the $n^{th}$ law and FFT processing lend themselves to implementation within high-speed application-specific-integrated-circuits (ASIC), field-programmable-gate-arrays (FPGA), or complex-programmable-logic-devices (CPLD). Indeed, the functionality illustrated in FIG. 3A and 3B may be realized in any combination of hardware, software, and firmware.

Additional opportunities for varying the present invention arise in relation to sampling the received signal. Rather than mixing the received signal to a baseband frequency, the mobile terminal 10 may mix the received signal to an intermediate frequency. Further, the oversampling rate M may be many times the transmitted symbol rate, thereby yielding many initial sets of symbol rate samples, or M may be a small multiple of the transmitted symbol rate, yielding only a small number of initial symbol-rate sample sets. Subsequent processing of the symbol-rate sample sets may involve all of the symbol-rate sample sets, or simply a plurality of them.

What is claimed is:

1. A method for initially synchronizing a mobile terminal, said method comprising:

receiving a received signal containing a sequence of symbols including a synchronization word, said symbols being selected from a set of n possible symbols;

converting said received signal to a lower frequency to produce a lower frequency signal having an unknown frequency error;

sampling said lower frequency signal at a rate M times a transmitted symbol rate to produce M symbol-rate sample sets having M different sampling phases;

raising a plurality of said symbol-rate sample sets to an $n^{th}$ power to produce a plurality of n-power sample sets;

performing a FFT on said plurality of n-power sample sets to produce a plurality of FFT data sets;

selecting one of said plurality of symbol-rate sample sets based on said plurality of FFT data sets; and correlating a known sequence with said selected symbol-rate sample set to locate said synchronization word in said selected symbol-rate sample set.

2. The method of claim 1 wherein selecting one of said plurality of symbol-rate sample sets based on said plurality of FFT data sets comprises:

determining a peak magnitude in each of said plurality of FFT data sets;

comparing said peak magnitudes to determine a maximum peak magnitude;

identifying one of said plurality of FFT data sets containing said maximum peak magnitude; and selecting said one of said plurality of symbol-rate sample sets based on said FFT data set containing said maximum peak magnitude.

3. A method for initially synchronizing a mobile terminal, said method comprising:

receiving a received signal containing a sequence of symbols including a synchronization word, said symbols being selected from a set of n possible symbols;

converting said received signal to a lower frequency to produce a lower frequency signal having an unknown frequency error;

sampling said lower frequency signal at a rate M times a transmitted symbol rate to produce M symbol-rate sample sets having M different sampling phases;

raising a plurality of said symbol-rate sample sets to an $n^{th}$ power to produce a plurality of n-power sample sets;

performing a FFT on said plurality of n-power sample sets to produce a plurality of FFT data sets;

determining a set of probable values for said unknown frequency error based on said plurality of FFT data sets;

selecting one of said symbol-rate sample sets; and correlating a known sequence using said selected symbol-rate sample set compensated for said unknown frequency error using said set of probable values to locate said synchronization word in said selected symbol-rate sample set.

4. The method of claim 3 wherein determining a set of probable values for said unknown frequency error based on said plurality of FFT data sets comprises:

determining a peak magnitude in each of said plurality of FFT data sets;

comparing said peak magnitudes in each of said plurality of FFT data sets to determine a maximum peak magnitude;

selecting one of said FFT data sets containing said maximum peak magnitude;

determining an offset frequency based on said maximum peak magnitude in said selected FFT data set; and determining said set of probable values based on said offset frequency.

5. The method of claim 4 wherein determining said set of probable values based on said offset frequency further comprises determining a set of possible alias frequencies of said offset frequency.

6. A method for initially synchronizing a mobile terminal, said method comprising:

receiving a received signal containing a sequence of symbols including a synchronization word, said symbols being selected from a set of n possible symbols;

converting said received signal to a lower frequency to produce a lower frequency signal having an unknown frequency error;

sampling said lower frequency signal at a rate M times a transmitted symbol rate to produce M symbol-rate sample sets having M different sampling phases;

raising a plurality of said symbol-rate sample sets to an $n^{th}$ power to produce a plurality of n-power sample sets;

performing a FFT on said plurality of n-power sample sets to produce a plurality of FFT data sets;

determining a set of probable values for said unknown frequency error based on said plurality of FFT data sets;

selecting one of said symbol-rate sample sets based on said plurality of FFT data sets; and correlating a known sequence with said selected symbol-rate sample set compensated for said unknown frequency error using said set of probable values to locate said synchronization word in said selected symbol-rate sample set.

7. The method of claim 6 wherein selecting one of said symbol-rate sample sets based on said plurality of FFT data sets comprises:

determining a peak magnitude in each of said plurality of FFT data sets;

comparing said peak magnitudes to determine a maximum peak magnitude; and identifying one of said plurality of FFT data sets containing said maximum peak magnitude.

8. The method of claim 7 wherein selecting one of said symbol-rate sample sets based on said plurality of FFT data sets further comprises selecting said one of said symbol-rate sample sets based on said FFT data set containing said maximum peak magnitude.

9. The method of claim 7 wherein determining a set of probable values for said unknown frequency error based on said plurality of FFT data sets comprises determining an offset frequency in said FFT data set containing said maximum peak magnitude and determining said set of probable values for said unknown frequency error based on said offset frequency.

10. The method of claim 9 wherein determining a set of probable values for said unknown frequency error based on said plurality of FFT data sets further comprises determining a set of possible alias frequencies of said offset frequency.

11. A method of sampling a received signal containing a sequence of symbols selected from a set of n possible symbols, said method comprising:

sampling said received signal at a rate M times a transmitted symbol rate to form a plurality of symbol-rate sample sets, each having one of M different sampling phases;

raising a plurality of said symbol-rate sample sets to an $n^{th}$ power to form a plurality of n-power sample sets;

performing a FFT on said plurality of n-power sample sets to form a plurality of FFT data sets;

processing said plurality of FFT data sets to determine a preferred sampling phase; and selecting one of said symbol-rate sample sets as a preferred symbol-rate sample set based on said preferred sampling phase.

12. The method of claim 11 wherein processing said plurality of FFT data sets to determine a preferred sampling phase comprises:

determining a peak magnitude in each of said plurality of FFT data sets;

comparing said peak magnitudes to identify one of said FFT data sets containing a maximum peak magnitude; and determining said preferred sampling phase based on said FFT data set containing said maximum peak magnitude.

13. The method of claim 12 further comprising converting said received signal to a lower frequency prior to sampling said received signal, said lower frequency received signal having an unknown frequency error caused by an unknown offset in said reference frequency.

14. The method of claim 13 wherein determining said preferred sampling phase based on said FFT data set containing said maximum peak magnitude further comprises:

determining an offset frequency corresponding to said maximum peak magnitude; and determining a set of possible values of said unknown frequency error based on said offset frequency.

15. The method of claim 14 wherein determining a set of possible values of said unknown frequency error comprises determining a set of possible alias frequencies for said offset frequency.

16. The method of claim 11 wherein a value for said $n^{th}$ power is based on a number of modulation phases used by a remote station to transmit said symbols in said received signal.

17. A method of determining an unknown frequency error in an oscillator comprising:

receiving a signal containing a sequence of symbols selected from n possible symbols;

sampling said received signal asynchronously at a rate M times the transmitted symbol rate to produce M sets of symbol-rate sample sets having M different asynchronous sampling phases;

raising a plurality of said symbol-rate sample sets to an $n^{th}$ power to produce a plurality of n-power sample sets;

performing a FFT on said plurality of n-power sample sets to produce a plurality of FFT data sets;

determining a peak magnitude for each of said plurality of FFT data sets;

comparing said peak magnitudes to identify one of said FFT data sets containing a maximum peak magnitude;

determining an offset frequency in said FFT data set containing said maximum peak magnitude; and determining a set of possible values for said unknown frequency error based on said offset frequency.

18. The method of claim 17 wherein determining an offset frequency in said FFT data set containing said maximum peak magnitude comprises determining a frequency component in said FFT data set containing said maximum peak magnitude.

19. The method of claim 18 wherein determining a set of possible values for said unknown frequency error based on said offset frequency comprises determining a set of possible frequency aliases for said offset frequency.

20. The method of claim 17 wherein a value for said $n^{th}$ power is determined based on a number of modulation phases used by a remote station to transmit said sequence of symbols in said received signal.

21. A mobile terminal comprising:

a receiver receiving a signal containing a sequence of symbols including a known synchronization word;

a sampling device oversampling said received signal at a rate M-times a transmitted symbol rate; and a signal processor processing said oversampled received signal to determine a location of said known synchronization word in said oversampled received signal, said signal processor comprising:

a downsampler having up to M possible downsampling phases, said downsampler controlled by a phase control signal and downsampling said oversampled received signal to form a preferred symbol-rate sample set corresponding to a preferred sampling phase;

a correlation processor compensating said preferred symbol-rate sample set for an unknown frequency error based on a set of compensation values and correlating said compensated preferred symbol-rate sample set with a known sequence to determine said location of said known synchronization word within said compensated preferred symbol-rate sample set; and a sampling phase controller providing said phase control signal and said set of compensation values based on said oversampled received signal.

22. The mobile terminal of claim 21 wherein said sampling phase controller comprises:

a sampling demultiplexer forming a plurality of symbol-rate sample sets from said oversampled received signal;

an $n^{th}$ law processor raising said symbol-rate sample sets to an $n^{th}$ power, thereby forming a corresponding plurality of n-power sample sets;

a FFT processor performing a FFT on said plurality of n-power sample sets, thereby forming a corresponding plurality of FFT data sets;

a peak processor determining a peak magnitude in each of said FFT data sets;

a maximum value processor comparing said peak magnitudes in each of said FFT data sets to identify one of said FFT data sets containing a maximum peak magnitude, and outputting said phase control signal based on said FFT data set containing said maximum peak magnitude; and a compensation processor determining an offset frequency in said FFT data set containing said maximum peak magnitude and outputting said set of compensation values based on said offset frequency.

23. The mobile terminal of claim 22 wherein said offset frequency is related to said unknown frequency error and wherein at least one of said compensation values essentially nullifies an undesired effect of said unknown frequency error in said correlation between said compensated symbol-rate sample set and said known sequence performed by said correlation processor.

* * * * *